(12) United States Patent
Su et al.

(10) Patent No.: US 6,928,209 B2
(45) Date of Patent: Aug. 9, 2005

(54) OPTICAL ADD AND DROP MULTIPLEXER USING RING RESONATORS

(75) Inventors: Jun Su, San Jose, CA (US); Yi Ding, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 10/367,268

(22) Filed: Feb. 15, 2003

(65) Prior Publication Data

US 2004/0161188 A1 Aug. 19, 2004

(51) Int. Cl.[7] .............................. G02B 6/28; G02F 1/01; H04J 14/02
(52) U.S. Cl. .............................. 385/24; 385/1; 385/16; 385/32; 398/83; 398/85
(58) Field of Search ........................... 385/1–10, 16–24, 385/32; 398/43–103, FOR 115–125

(56) References Cited

U.S. PATENT DOCUMENTS

| | | | | |
|---|---|---|---|---|
| 6,411,752 B1 | * | 6/2002 | Little et al. | 385/17 |
| 6,633,593 B2 | * | 10/2003 | Ksendzov et al. | 372/20 |
| 2002/0126291 A1 | * | 9/2002 | Qian et al. | 356/450 |

* cited by examiner

*Primary Examiner*—Michelle R. Connelly-Cushwa
(74) *Attorney, Agent, or Firm*—Trop, Pruner & Hu, P.C.

(57) ABSTRACT

An optical add/drop multiplexer may be formed using ring resonators. In some embodiments, ring resonators may be used instead of Bragg gratings in a Mach-Zehnder interferometer configuration. One or more wavelengths may be added or dropped or a band pass of wavelengths may be added or dropped in a wavelength division multiplexed system.

20 Claims, 4 Drawing Sheets

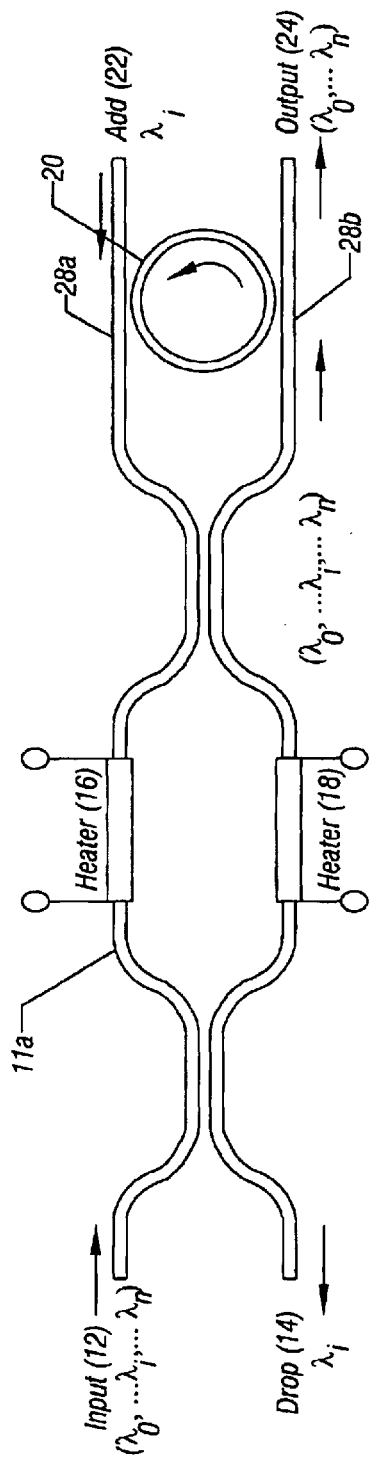
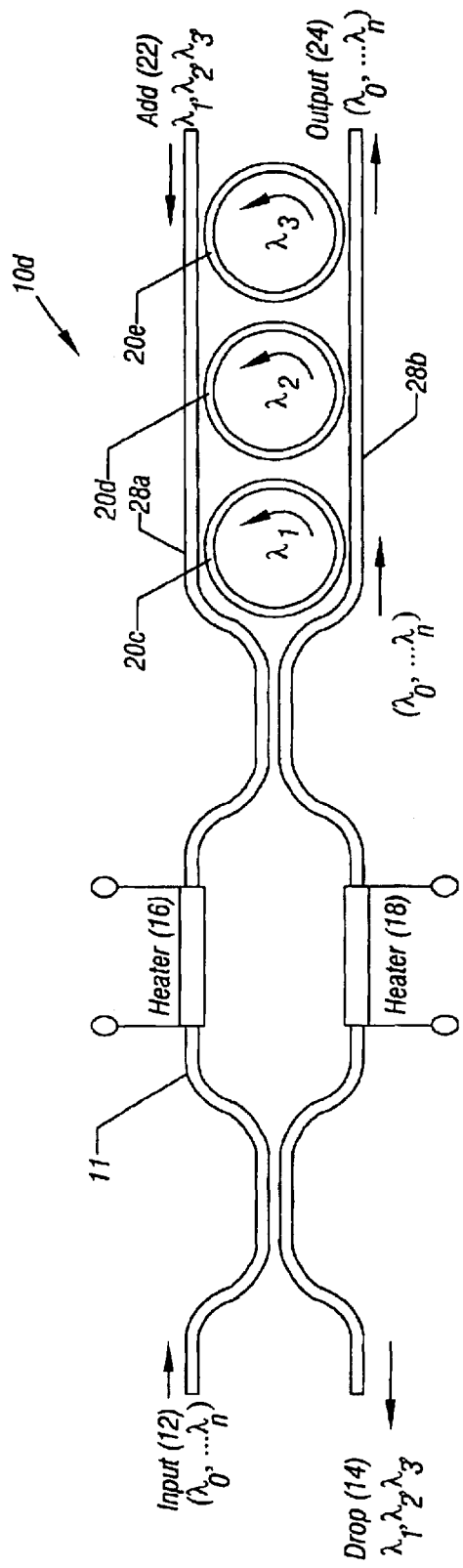

OPTICAL ADD AND DROP MULTIPLEXER USING RING RESONATORS

BACKGROUND

This invention relates generally to optical add/drop multiplexers (OADMS) that may be used in wavelength division multiplexed networks to either add a channel or to drop a channel from the network.

Conventionally, optical networks may consist of carriers that carry a large number of channels, each channel being of a different wavelength. At stations along the network, additional channels may be added or channels may be dropped. Typically, an optical add/drop multiplexer is used to either add or withdraw such channels. The most conventional form of OADM includes a Mach-Zehnder interferometer including Bragg gratings.

The Mach-Zehnder interferometer with photo-induced Bragg gratings is an attractive device as a wavelength-selective OADM circuit. As an example, a Mach-Zehnder interferometer-based fiber grating may include identical Bragg gratings photo-imprinted in the two arms of a Mach-Zehnder interferometer. The Bragg gratings act as distributed-feedback reflection mirrors. A wavelength division multiplexed signal launched into the designated input port of the Mach-Zehnder interferometer is split evenly by a first 3 deciBel (dB) coupler, provided that the interferometer includes two 3 dB couplers having the same coupling ratio and the same arm path lengths.

The wavelength division multiplexed signal, except the Bragg-resonant wavelength, propagates along each arm to the second 3 dB coupler, where the wavelength division multiplexed signal is coherently recombined to emerge from the output port.

The signal of the Bragg-resonant wavelength is reflected back by the Bragg gratings located symmetrically in the two arms. The reflected Bragg-resonant wavelength appears from the drop port rather than the input port, because of the double half-a-π (π/2) phase shift arising at the 3 dB coupler. Owing to the merit of the symmetrical structure of the device, another signal of the Bragg wavelength inserted from the add port can be guided to the output port.

One problem with Bragg gratings is that, in some cases, they involve the use of sophisticated ultraviolet interference patterns and phase grating masks. The generation of these devices may be complex and their tuning can sometimes be awkward.

Thus, there is a need for an optical add/drop multiplexer with improved characteristics.

BRIEF DESCRIPTION OF THE DRAWINGS

FIG. 6 is a schematic depiction of another embodiment of the present invention;

FIG. 8 is a schematic depiction of another embodiment of the present invention.

DETAILED DESCRIPTION

Figure 1:
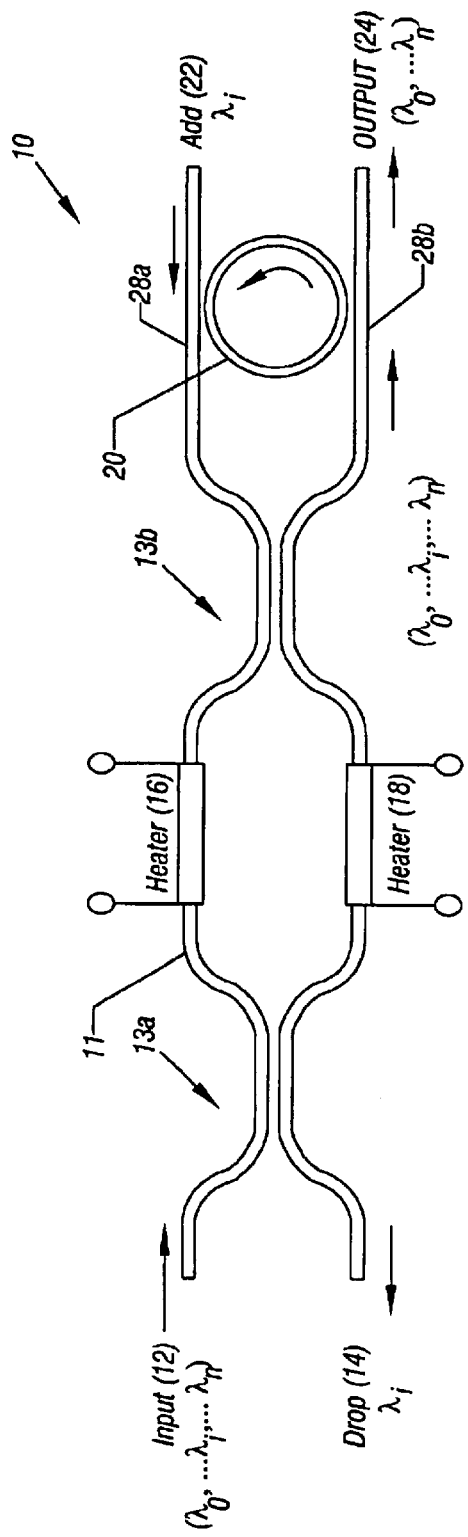
FIG. 1 is a schematic depiction of one embodiment of the present invention.

Referring to FIG. 1, an optical add/drop multiplexer 10 may use a symmetrical Mach-Zehnder interferometer 11. The interferometer 11 includes an upper arm 28a and a lower arm 28b. The upper arm 28a includes an input 12, a heater 16, and an add port 22. The lower arm 28b includes a drop port 14, a heater 18, and an output port 24. Between the upper and lower arms 28 is a ring resonator 20.

In one embodiment of the present invention, the multiplexer 10 may be formed as a planar light circuit in a semiconductor substrate. The planar light circuit includes a substrate in which are formed the arms 28a and 28b, the heaters 16 and 18, the ports 12, 14, 22, and 24, and the ring resonator 20 in one embodiment.

Figure 2:
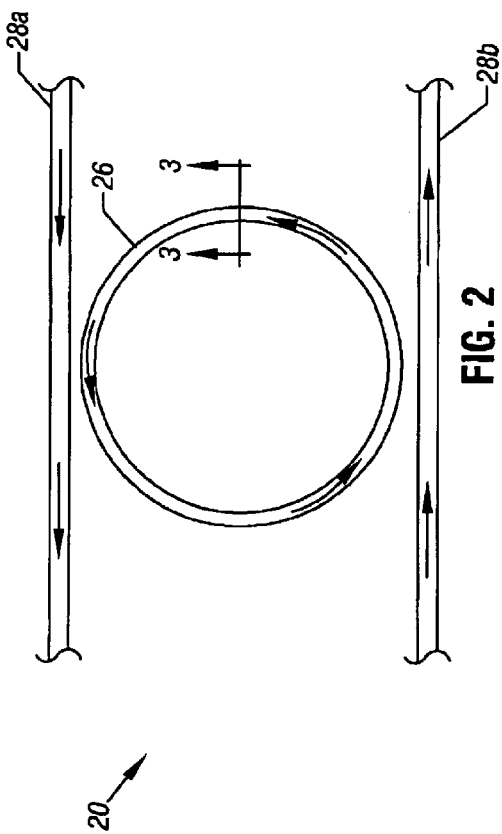
FIG. 2 is a partial, enlarged depiction of the embodiment shown in FIG. 1, focusing on the ring resonator in accordance with one embodiment of the present invention.

Referring to FIG. 2, the ring resonator 20 may include a ring waveguide 26 formed in the substrate. The ring waveguide 26 may be positioned proximately to the upper arm 28a and the lower arm 28b.

Figure 3:
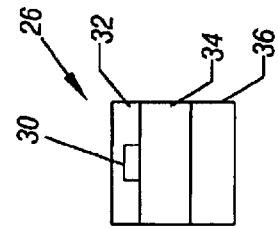
FIG. 3 is a greatly enlarged cross-sectional view taken generally along the line 3—3 in FIG. 2.

As shown in FIG. 3, the ring waveguide 26 may include an upper cladding layer 32, a lower cladding layer 34, and a substrate 36. In one embodiment, the substrate 36 may be a silicon substrate, the cladding layers 32 and 34 may be made of silicon dioxide, and the core 30 may be formed of SiON. The ring waveguide 26 may be formed in the silicon substrate 36 using plasma-enhanced chemical vapor deposition.

Light is coupled between the straight portions of the arms 28 and the ring waveguide 26 by way of evanescent wave interaction. The resonator 20 has a transmissivity spectrum including multiple sharp resonance peaks as a function of wavelength reminiscent of a cone.

In the embodiment shown in FIG. 1, the Mach-Zehnder interferometer 11 is symmetrical and the heaters 16 and 18 are not used. The wavelength division multiplexed signal is launched into the input port 12, including wavelengths from 0 through N. The wavelength division multiplexed signal is split evenly by the first 3 dB coupler 13a and is coherently recombined after passing through the second 3 dB coupler 13b. When the signal reaches the optical ring resonator 20, the resonant wavelength, e.g. $\lambda_i$, is coupled into the ring waveguide 26 from the lower arm 28b and subsequently coupled into the upper arm 28a.

The resonant wavelength $\lambda_i$ satisfies the following resonance relationship: $\lambda_i = 2\pi r n_e/m$ where, r is the ring radius, $n_e$ is the effective index of the ring waveguide 26, and m is an integer. Owing to the symmetrical nature of the Mach-Zehnder interferometer 11, the coupled wavelength into the upper arm 28a emerges at the drop port 14. Similarly, another signal of wavelength $\lambda_i$ coming from the add port 22 can be coupled into the ring resonator 20 to show up at the output port 24.

Figure 4:
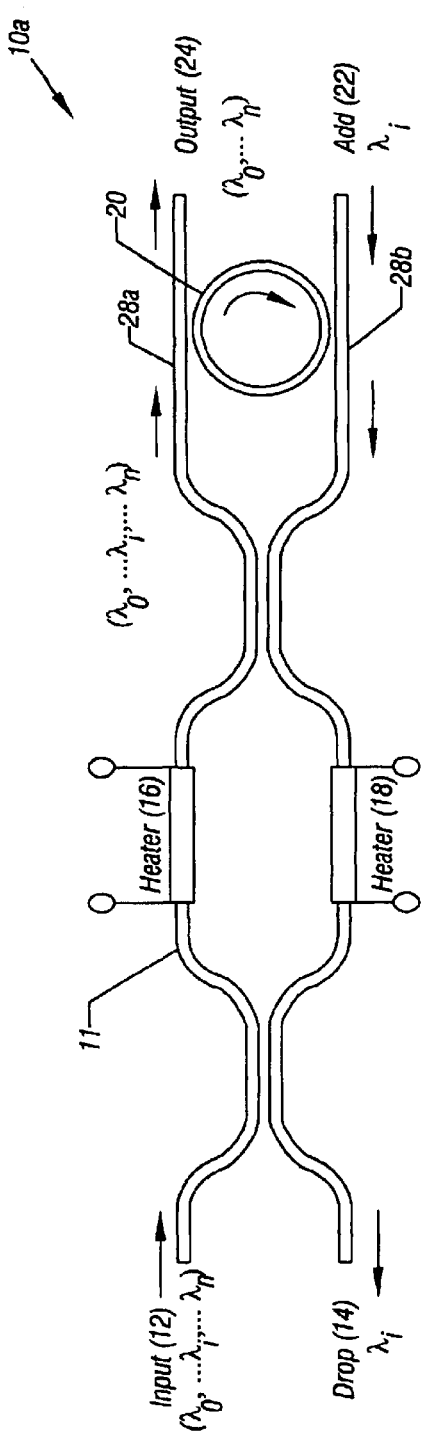
FIG. 4 is a schematic depiction of another embodiment of the present invention.

Referring to FIG. 4, in the OADM 10a, either the heater 16 or the heater 18 is turned on. As a result, the add port 22 and output ports 24 are interchanged between the arms 28a and 28b (compared to the OADM 10 shown in FIG. 1) because of a switching feature of the Mach-Zehnder interferometer 11.

Figure 5:
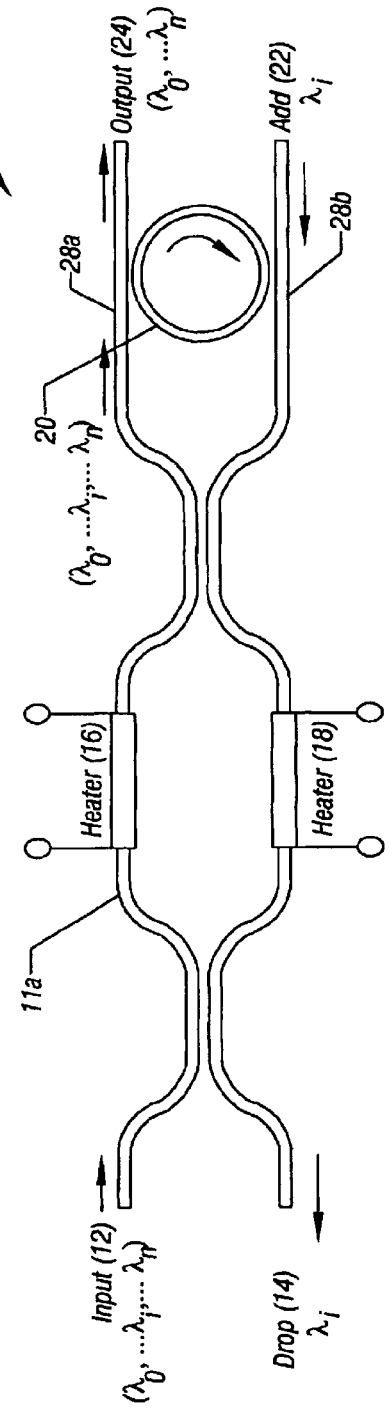
FIG. 5 is a schematic depiction of another embodiment of the present invention.

Referring to FIG. 5, the Mach-Zehnder interferometer 11a is asymmetrical and the heaters 16 and 18 are turned off. In this case, the output port 24 is in the upper arm 28a and the add port is in the lower arm 28b.

Similarly, in the embodiment shown in FIG. 6, the Mach-Zehnder interferometer 11a is asymmetrical. Either the heater 16 or the heater 18 is turned on, and the add port 22 is in the upper arm 28a while the output port 24 is in the lower arm 28b.

Figure 7:
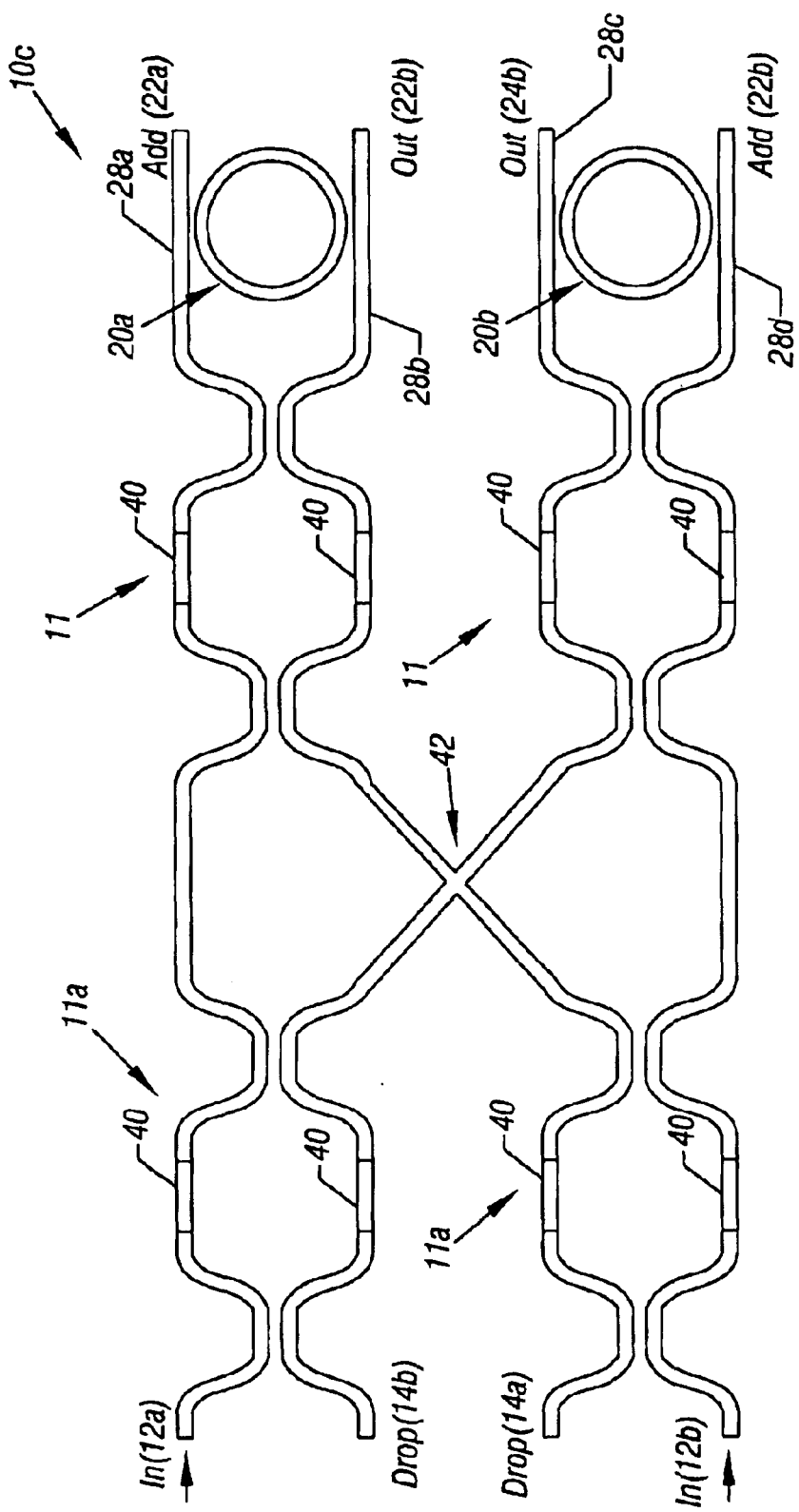
FIG. 7 is a schematic depiction of another embodiment of the present invention.

Referring next to FIG. 7, an arrayed optical add/drop multiplexer matrix 10c includes input ports 12a and 12b, output ports 24a and 24b, drop ports 14a and 14b, and add ports 22a and 22b. The matrix 10c includes arms 28a and 28b, as well as arms 28c and 28b. The ring resonators 20a and 20b are included between pairs of arms 28.

An asymmetrical Mach-Zehnder interferometer 11a includes heaters 40, while a symmetrical Mach-Zehnder interferometer 11 also includes heaters 40. The arms 28c and 28b cross at 42. The arrayed optical add/drop multiplexer matrix 10c may include a number of additional arms not shown in FIG. 7.

The ring resonators 20 are not necessarily of identical resonant wavelengths. Therefore, the matrix 10c is able to add or drop multiple wavelengths simultaneously, adding significant flexibility to communication system applications.

Referring to FIG. 8, a bandpass optical add/drop multiplexer 10d allows adding or dropping a sub-band or a plurality of channels of different wavelengths out of a larger group of channels. Multiple ring resonators 20 may be utilized, with each ring resonator 20 tuned to one wavelength. Alternatively, one ring resonator 20 may have a bandpass characteristic. The ring resonator 20 can be a normal ring with fine structures such as a ring with lithographically written gratings.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An optical add/drop multiplexer comprising:
   an input port;
   an output port;
   an add port;
   a Mach-Zehnder interferometer with arms; and
   a ring resonator between the arms of said Mach-Zehnder interferometer.

2. The multiplexer of claim 1 wherein said multiplexer is a planar light circuit.

3. The multiplexer of claim 2 including a heater in at least one of said arms.

4. The multiplexer of claim 3 including a heater in both of said arms.

5. The multiplexer of claim 1 including a symmetrical Mach-Zehnder interferometer.

6. The multiplexer of claim 1 including an asymmetrical Mach-Zehnder interferometer.

7. The multiplexer of claim 1 including an asymmetrical and a symmetrical Mach-Zehnder interferometer.

8. The multiplexer of claim 1 including at least two ring resonators.

9. An optical add/drop multiplexer comprising:
   an input port;
   an output port;
   an add port;
   a ring resonator between said add and output port; and
   a symmetrical and an asymmetrical Mach-Zehnder interferometer.

10. The multiplexer of claim 9 wherein said multiplexer is a planar light circuit.

11. The multiplexer of claim 9 wherein said multiplexer includes a Mach-Zehnder interferometer with arms.

12. The multiplexer of claim 11 wherein said ring resonator is between the arms of said Mach-Zehnder interferometer.

13. The multiplexer of claim 12 including a heater in at least one of said arms.

14. The multiplexer of claim 13 including a heater in both of said arms.

15. The multiplexer of claim 9 including at least two ring resonators.

16. A method comprising:
   forming an optical add/drop multiplexer including an input port, an output port, an add port, a ring resonator between said add and output ports, and a Mach-Zehnder interferometer including arms and said ring resonator between said arms.

17. The method of claim 16 including forming a ring resonator as a planar light circuit.

18. The method of claim 16 including forming a Mach-Zehnder interferometer with arms.

19. The method of claim 18 including using a symmetrical Mach-Zehnder interferometer.

20. The method of claim 16 including passing a band pass of wavelengths.

* * * * *